US011630728B2

(12) United States Patent
Lee (10) Patent No.: US 11,630,728 B2
(45) Date of Patent: Apr. 18, 2023

(54) DATA PROCESSING METHOD FOR AFA STORAGE DEVICE TO RESTORE DATA PROTECTION CAPABILITY AND THE AFA STORAGE DEVICE UTILIZING THE SAME

(71) Applicant: Silicon Motion, Inc., Hsinchu County (TW)

(72) Inventor: Ting-Chu Lee, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 11 days.

(21) Appl. No.: 17/338,710

(22) Filed: Jun. 4, 2021

(65) Prior Publication Data

US 2022/0066866 A1 Mar. 3, 2022

(30) Foreign Application Priority Data

Aug. 25, 2020 (TW) ................................. 109128925

(51) Int. Cl.
*G06F 11/10* (2006.01)
(52) U.S. Cl.
CPC ........ *G06F 11/108* (2013.01); *G06F 11/1092* (2013.01); *G06F 11/1096* (2013.01)
(58) Field of Classification Search
CPC ....................................... G06F 11/1076–1096
USPC ....................................................... 714/6.24
See application file for complete search history.

(56) References Cited

U.S. PATENT DOCUMENTS

| | | | |
|---|---|---|---|
| 7,206,899 B2* | 4/2007 | Schmisseur | G06F 11/1088 711/155 |
| 8,195,978 B2* | 6/2012 | Flynn | G06F 11/1008 714/6.1 |
| 9,058,288 B2* | 6/2015 | Golov | G06F 11/108 |
| 10,042,565 B2 | 8/2018 | Lee | |
| 10,453,530 B2 | 10/2019 | Lee | |
| 10,534,542 B2 | 1/2020 | Trehan | |
| 10,635,609 B2* | 4/2020 | Olarig | G06F 13/4282 |
| 2009/0113235 A1* | 4/2009 | Selinger | G06F 11/108 711/E12.001 |

FOREIGN PATENT DOCUMENTS

| | | |
|---|---|---|
| CN | 107239234 A | 10/2017 |
| KR | 10-1970864 | 4/2019 |

\* cited by examiner

*Primary Examiner* — Joseph R Kudirka
(74) *Attorney, Agent, or Firm* — Winston Hsu (57) ABSTRACT

An all flash array storage device includes a flash memory array including multiple flash memories and a microprocessor. The flash memories correspond to multiple logical aggregation units. Each logical aggregation unit includes multiple stripes. Each stripe includes multiple storage units, including multiple data units and at least one parity unit. The microprocessor detects a status of the flash memories. In response to a detection result indicating that one of the flash memories has been removed from the flash memory array, the microprocessor sequentially performs a repair operation on the stripes comprised in one or more logical aggregation units that have been written with data. In the repair operation of one stripe, the microprocessor recalculates protection information of the stripe according to content stored in a portion of data units of the stripe and writes the recalculated protection information in one or more storage units of the stripe.

15 Claims, 8 Drawing Sheets

DATA PROCESSING METHOD FOR AFA STORAGE DEVICE TO RESTORE DATA PROTECTION CAPABILITY AND THE AFA STORAGE DEVICE UTILIZING THE SAME

BACKGROUND OF THE INVENTION

1. Field of the Invention

The invention relates to a data processing method for an All Flash Array (AFA) storage device, more particularly to a data processing method for efficiently restore the original data protection capability of an AFA storage device when loss of disk has occurred to the AFA storage device.

2. Description of the Prior Art

All Flash Array (AFA) is an architecture of a storage device, whose basic structure is to use several flash memory disks to form a storage array, so as to greatly increase the storage space of the storage device. All flash arrays are usually used in servers on the network side to store large amounts of data from multiple users. In order to prevent data loss in the storage device caused by one or more flash memory disks in the storage array being damaged or removed, the storage device uses the error protection mechanism adopted in the Redundant Array of Independent Disks (RAID) technology for data protection. In the error protection mechanism adopted by RAID, the storage device will calculate protection information based on the written data. When it is found that the valid data is lost, the protection information can be used to reversely deduce the content of the lost valid data.

For example, the storage device may calculate M pieces of protection information based on the written data, so that the storage device can have a protection capability of "plus M" (+M), which means that even when M flash memory disks are damaged or removed, the storage device can still use the remaining data to perform data recovery and deduce the data stored on the M flash memory disks that have been damaged or removed.

However, for storage devices with +M protection capability, when a flash memory disk in the storage array is damaged or removed, the data protection capability will drop to +(M−1), and when the number of damaged or removed flash memory disks is equal to M, the storage device no longer has the ability to protect data.

In order to solve the above problem, for the storage device can still restore the original data protection capability after the loss of disk (including the aforementioned damage or removal of the flash memory disk), and to further avoid introducing excessive write operations, which will cause in a significant drop in the performance of the storage device, due to the need of performing the operations related to the restoring of the original data protection capability, a novel data processing method is required, so as to efficiently restore the original data protection capability when loss of disk has occurred to the all flash array storage device.

SUMMARY OF THE INVENTION

It is an object of the invention to efficiently restore original data protection capability when loss of disk has occurred to an all flash array storage device.

According to an embodiment of the invention, an all flash array storage device comprises a flash memory array and a microprocessor. The flash memory array comprises a plurality of flash memories. The flash memories correspond to a plurality of logical aggregation units. Each logical aggregation unit comprises a plurality stripes. Each stripe comprises a plurality of storage units. The storage units comprise a plurality of data units for storing data and at least one parity unit for storing protection information. The microprocessor is coupled to the flash memory array and configured to detect a status of the flash memories. When the microprocessor detects one of the flash memories has been removed from the flash memory array, the microprocessor is configured to sequentially perform a repair operation on the stripes comprised in one or more logical aggregation units that have been written with data. In the repair operation corresponding to one stripe, the microprocessor is configured to recalculate protection information of the stripe according to content stored in a portion of data units of the stripe and write the recalculated protection information in one or more storage units of the stripe. A number of data units in the portion of data units of the stripe is less than a number of all data units comprised in the stripe.

According to another embodiment of the invention, a data processing method for an all flash array storage device is proposed. The all flash array storage device comprises a flash memory array, the flash memory array comprises a plurality of flash memories, the flash memories correspond to a plurality of logical aggregation units, each logical aggregation unit comprises a plurality stripes, each stripe comprises a plurality of storage units, and the storage units comprise a plurality of data units for storing data and at least one parity unit for storing protection information. The data processing method comprises: sequentially performing a repair operation on the stripes comprised in one or more logical aggregation units that have been written with data in response to a detection result indicating that one of the flash memories has been removed from the flash memory array. Step of sequentially performing the repair operation on the stripes further comprises: recalculating protection information of the stripe according to content stored in a portion of data units of the stripe; and writing the recalculated protection information in one or more storage units of the stripe. A number of data units in the portion of data units of the stripe is less than a number of all data units comprised in the stripe.

According to another embodiment of the invention, an all flash array controller comprises a memory device and a microprocessor. The microprocessor is coupled to the memory device and a flash memory array and configured to manage the flash memory array according to data stored in the memory device. The flash memory array comprises a plurality of flash memories, the flash memories correspond to a plurality of logical aggregation units, each logical aggregation unit comprises a plurality stripes, each stripe comprises a plurality of storage units, and the storage units comprise a plurality of data units for storing data and at least one parity unit for storing protection information. The microprocessor detects that loss of disk has occurred to the flash memory array, the microprocessor is configured to sequentially perform a repair operation on the stripes comprised in one or more logical aggregation units that have been written with data. In the repair operation corresponding to one stripe, the microprocessor is configured to recalculate the protection information of the stripe according to content stored in a portion of data units of the stripe and write the recalculated protection information in one or more storage units of the stripe. A number of data units in the portion of data units of the stripe is less than a number of all data units comprised in the stripe.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

The invention relates to an all flash array (AFA) storage device and a data processing method for the AFA storage device. According to an embodiment of the invention, the AFA storage device may comprise a plurality of flash memory disks, each flash memory disk may comprise at least one flash memory, and the flash memories comprised in flash memory disks may form a flash memory array.

Figure 1:
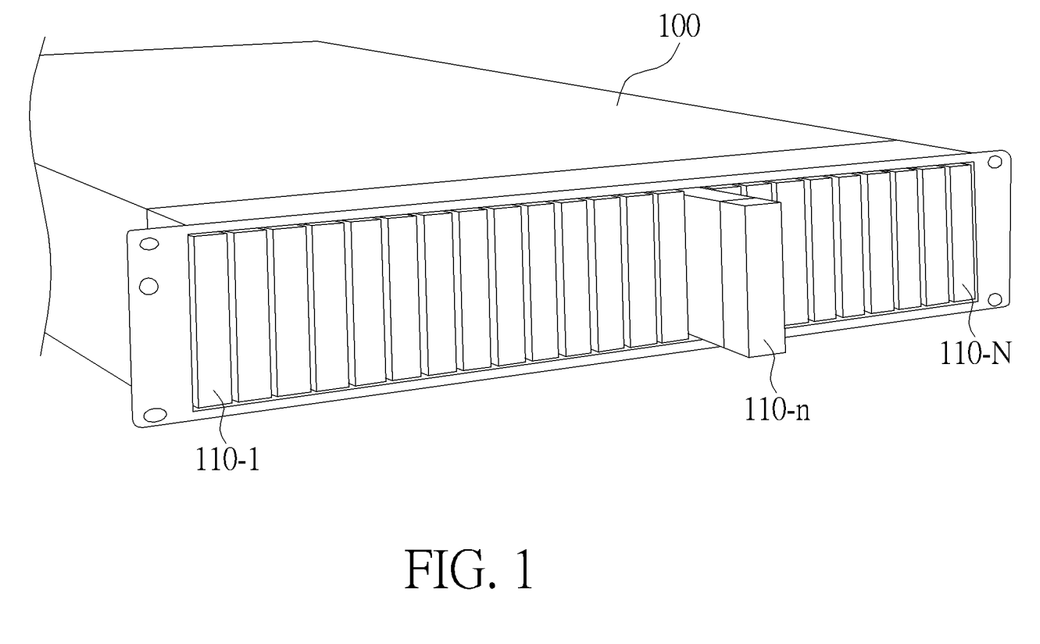
FIG. 1 is a diagram showing an exemplary appearance of an AFA storage device according to an embodiment of the invention.

FIG. 1 is a diagram showing an exemplary appearance of an AFA storage device according to an embodiment of the invention. In the embodiment shown in FIG. 1, the AFA storage device 100 may comprise N flash memory disks, for example, the flash memory disks 110-1 to 110-N shown in the FIG. 1, where N is a positive integer greater than 1. Each flash memory disk may comprise a flash memory. Therefore, the AFA storage device 100 may comprise a flash memory array composed of N flash memories.

When loss of disk has occurred to an AFA storage device, for example, when one of the flash memory disks (for example, the flash memory disk 110-$n$, where n is a positive integer) is removed from the AFA storage device 100, or when the disk is damaged or cannot be recognized or identified, the data protection capability of the AFA storage device 100 will correspondingly decrease since the data stored in the flash memory disk 110-$n$ has been lost. In order to repair the lost data and to restore the original data protection capability of the AFA storage device 100 even after loss of disk has occurred, the AFA storage device 100 needs to perform a corresponding repair operation to deduce the lost data, and restore the original data protection capability. In the embodiment of the invention, by applying the proposed data processing method, the original data protection capability can be efficiently restored with a very small amount of write operations.

Figure 2:
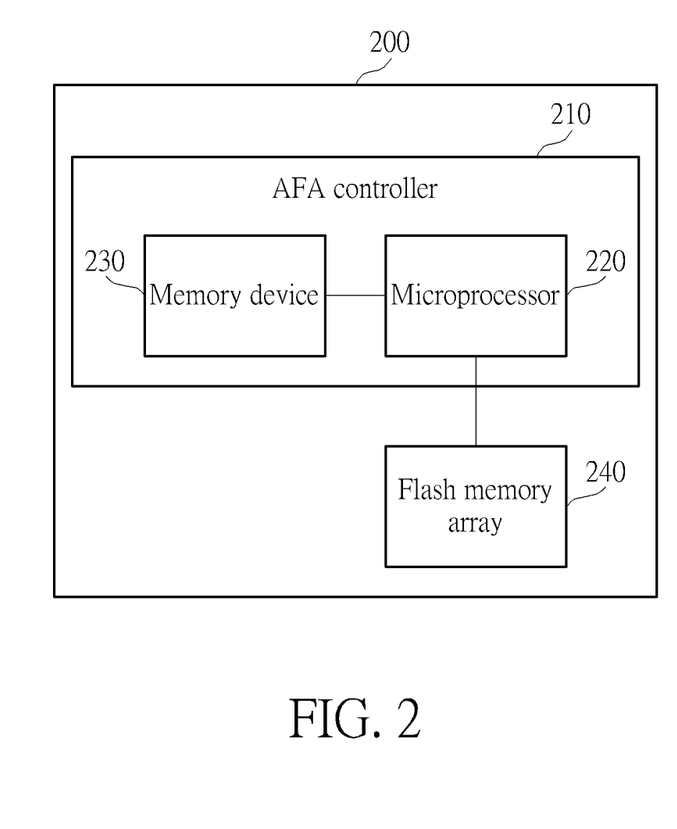
FIG. 2 is an exemplary block diagram of an AFA storage device according to an embodiment of the invention.

FIG. 2 is an exemplary block diagram of an AFA storage device according to an embodiment of the invention. According to an embodiment of the invention, the AFA storage device 200 may comprise an AFA controller 210 and a flash memory array 240 formed by the flash memories comprised in a plurality of flash memory disks. The AFA controller 210 may comprise a microprocessor 220 and a memory device 230. The microprocessor 220 may be coupled to the memory device 230 and the flash memory array 240 for managing the flash memory array 240 according to the data stored in the memory device 230. According to an embodiment of the invention, the flash memory array 240 may comprise a plurality of flash memories, and each flash memory may correspond to a flash memory disk. The microprocessor 220 may continuously detect a status of each flash memory disk or the corresponding flash memory. For example, the microprocessor 220 may continuously send out an inquiry signal to inquire about the status of the flash memory disk or the corresponding flash memory. When the microprocessor 220 cannot receive a response from the flash memory disk or the corresponding flash memory within a predetermined period of time, or the received response shows an abnormal status, or the microprocessor 220 can no longer recognize or identify the flash memory disk or the corresponding flash memory, the microprocessor 220 may determine that loss of disk has occurred to the AFA storage device 200 or the flash memory array 240. Since loss of disk may comprise several different situations caused by many different reasons, and these situations will all cause the data stored in the flash memory to be lost, in order to simplify the description, in the following paragraphs, the case "a flash memory being removed from the flash memory array 240" is a representative of various situations comprised in the aforementioned loss of disk. It should be understood that the proposed data processing method is not limited to only the case where the flash memory is removed, but can be applied to any situation that will eventually cause the data in a portion of the flash memories comprised in the flash memory array to be lost and cause the portion of the flash memories to be unusable.

Figure 3:
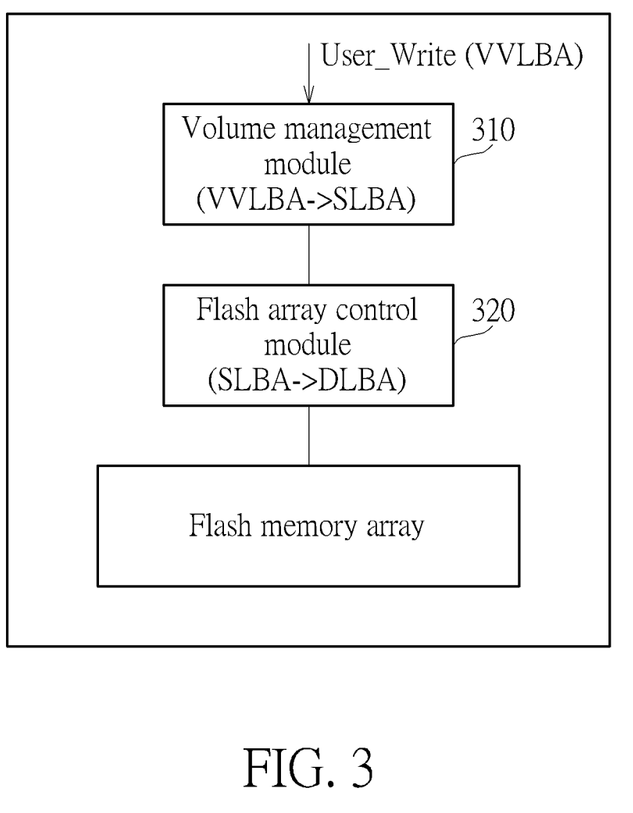
FIG. 3 shows the software architecture for managing the flash memory array according to an embodiment of the invention.

FIG. 3 shows the software architecture for managing the flash memory array according to an embodiment of the invention, for illustrating the internal address conversion operation of the AFA storage device. According to an embodiment of the invention, the microprocessor 220 may comprise one or more internal memory devices for storing data and program codes needed to manage the flash memory array. The microprocessor 220 may generate a plurality of modules for managing the flash memory array by executing the program code, and each module may perform corresponding operations. For example, the software module generated by the microprocessor 220 by executing the program code may comprise a volume management module 310 and a flash array control module 320. In response to a write command User_Write to write data corresponding to a virtual volume logical block address (VVLBA) into the flash memory array, the volume management module 310 may first convert the virtual volume logical block address (VVLBA) to a storage pool logical block address (SLBA), which is another internal logical address used in the microprocessor 220, and instruct the flash array control module 320 to write the data in this storage pool logical block address (SLBA). Then, the flash array control module 320 may convert the storage pool logical block address (SLBA) into a disk logical block address (DLBA) of the flash memory array, and execute the corresponding write operation to write the received data (that is, the data corresponding to this SLBA, and is also the data corresponding to the aforementioned VVLBA) into the corresponding disk logical block address (DLBA).

To be more specific, in response to a write command User_Write to write user data DATA_A corresponding to a virtual volume logical block address VVLBA_1 into the flash memory array, the microprocessor 220 of the AFA controller 210 may perform twice address conversion operations. The microprocessor 220 may first convert the virtual volume logical block address VVLBA_1 to a storage pool logical block address SLBA_1, which is another internally used logical address, and then convert the storage pool logical block address SLBA_1 into a disk logical block address DLBA_1. The microprocessor 220 may then issue a write command to one or more flash memory disks to write the data DATA_A to the storage unit(s) addressed by the disk logical block address DLBA_1 in the flash memory array.

It should be noted that, in the embodiments of the invention, the aforementioned storage unit is the storage unit in the AFA storage device, that is, the storage unit viewed or recognized by the AFA controller 210, which is not necessarily equivalent to the physical storage unit inside of each flash memory.

In addition, it should be noted that in the embodiments of the invention, the size of a "block" in the aforementioned "block address" is not necessarily equivalent to the size of a physical memory block comprised in the flash memory. For example, in one embodiment of the invention, the size of the "block" of a physical block address or a logical block address may be a write unit of 4K bytes (Byte). Therefore, a disk logical block address DLBA may address to a storage unit with a size of 4 KB in the flash memory array. On the other hand, the size of a physical memory block comprised in the flash memory may depend on the physical configuration of the flash memory.

In addition, it should be noted that, since the flash memory array is composed of the flash memories comprised in a plurality of flash memory disks, each flash memory disk may further comprise a memory controller for controlling access operations of the corresponding flash memory. Therefore, when the memory controller in each flash memory disk writes the received data into the corresponding flash memory according to the received disk logical block address DLBA (or, when the memory controller read data from the corresponding flash memory according to the received logical address), it will still perform another address conversion operation to convert the received logical address into the physical address that can address to one or more physical storage units of the corresponding flash memory, and this physical address (that is, the physical address viewed or recognized by the memory controller in each flash memory disk) is the address that directly corresponds to the physical storage unit.

Continuing the previous example, when the flash memory disk comprising the storage unit of the AFA storage device addressed by the disk logical block address DLBA_1 receives a write command comprising the data DATA_A and information regarding the disk logical block address DLBA_1, the memory controller of the flash memory disk may further convert this disk logical block address DLBA_1 into a physical block address PBA_1 that is actually used internally, where the physical block address PBA_1 addresses to the memory block and the page in the flash memory disk that are actually arranged to store the data DATA_A, and the memory controller accordingly stores the data DATA_A in the memory block and the page addressed by the physical block address PBA_1.

According to an embodiment of the invention, the flash memory array may comprise a plurality of flash memories, and the flash memories may correspond to a plurality of logical aggregation units (LAUs). Each LAU may comprise a plurality of stripes, and each stripe may comprise a plurality of storage units. The storage units in the same stripe in the AFA storage device may be actually distributed in multiple flash memories, and the storage units may comprise a plurality of data units for storing data and at least one parity unit for storing protection information.

Figure 4:
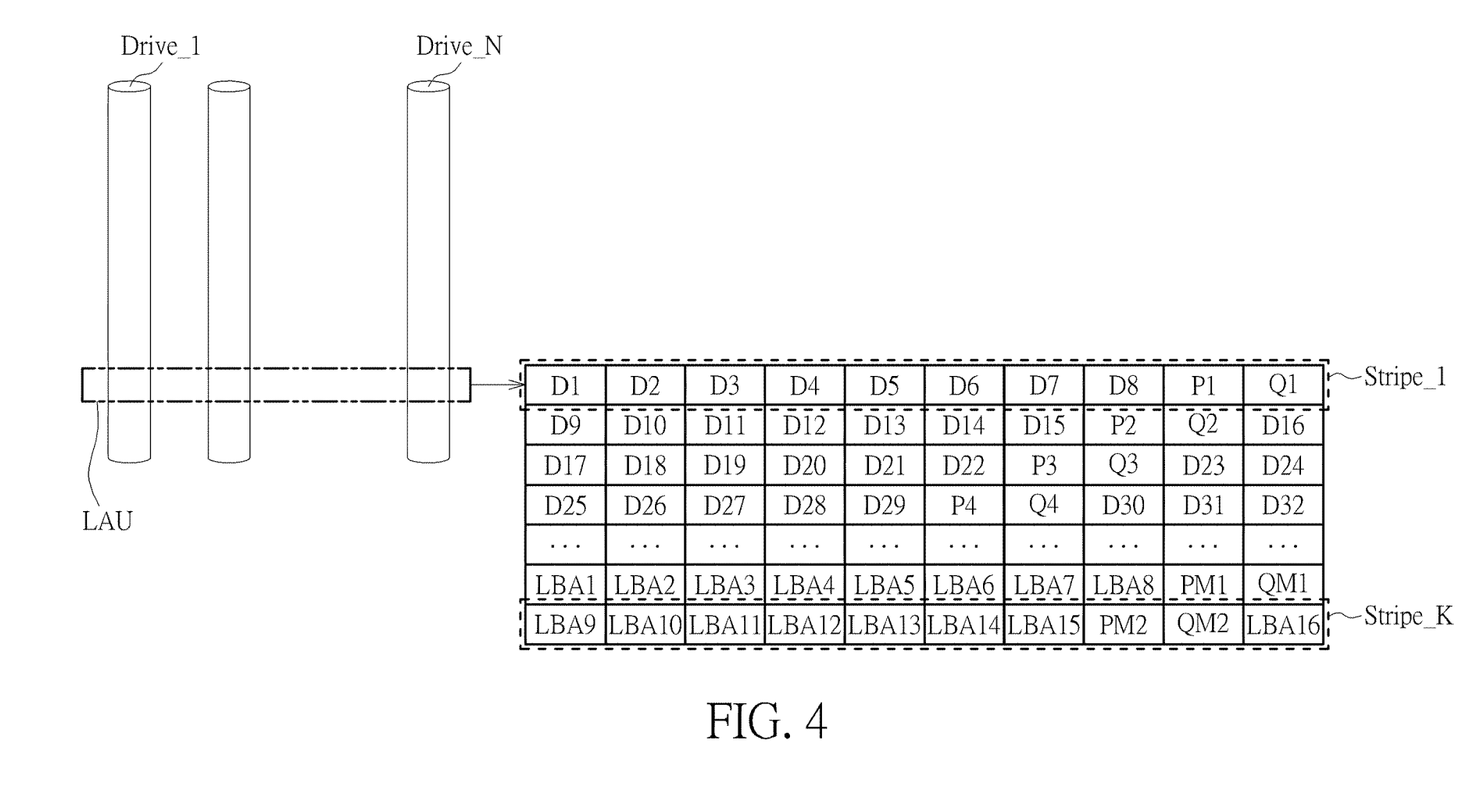
FIG. 4 is a schematic diagram of an LAU according to an embodiment of the invention.

FIG. 4 is a schematic diagram of an LAU according to an embodiment of the invention. In this example, the AFA storage device may comprise a plurality of flash memory disks Drive_1 to Drive_N, where N is a positive integer. The flash memory array composed of the flash memories comprised in the flash memory disks Drive_1 to Drive_N may form or correspond to a plurality of LAUs, such as a LAU framed by a dotted line in the FIG. 4, which may be one or the LAUs. Each LAU corresponds to a portion of the flash memory disk Drive_1 to Drive_N, for example, a 64 KB memory space.

The right side of FIG. 4 shows the data content stored in one LAU. Each LAU may comprise a plurality of stripes, such as the stripes Stripe_1 to Stripe_K shown in the FIG. 4, where K is a positive integer. Each stripe may comprise a plurality of storage units, and the size of one storage unit may be designed to be the size of one write unit (for example, 4 KB). The storage units in the same stripe may respectively correspond to different flash memory disks. The storage units may comprise or may be further divided into a plurality of data units for storing data (for example, the data D1 to D32) and a plurality of parity units for storing protection information (for example, protection information P1 to P4 and Q1 to Q4).

In the example shown in FIG. 4, N=10, and the flash memory array is designed to have a protection capability of +2. Therefore, as shown in the FIG. 4, the stripe stripe_1 may comprise 10 storage units corresponding to different flash memories, wherein 8 storage units may be configured as data units for storing data, and the remaining 2 storage units may be configured as the parity units for storing protection information. The microprocessor 220 may calculate the corresponding protection information (for example, the protection information P1 and Q1) of a stripe according to the content of the data stored in the data units (for example, the data D1 to D8 stored in the data units of the stripe Stripe_1), and store the protection information in the parity units of the same stripe, so as to protect the data stored in this stripe. The data stored in the data unit described here is the aforementioned user data.

In addition to storing user data, one or more stripes in an LAU may be further used to store the meta data of this LAU, where the meta data may at least comprise the Disk to Storage pool (D2S) mapping information of multiple stripes of this LAU. In the example shown in FIG. 4, the stripe used to store the meta data (for example, the stripes Stripe_(K−1) and Stripe_K) may record a plurality of logical block addresses, such as the logical block addresses LBA1~LBA16 shown in FIG. 4, where one data unit of the stripe for storing the meta data may be used to store the logical block address corresponding to the data stored in one data unit of the stripe (for example, stripe_1) used to store user data. That is, the logical block address recorded in one data unit of a stripe used to store the meta data may be the logical block address (for example, the aforementioned storage pool logical block address SLBA) corresponding to the data stored in one data unit of the stripe used to store user data. In addition, in order to protect the D2S mapping information, the microprocessor 220 may calculate the corresponding protection information (for example, the protect information PM1 and QM1) according to the content of the data (for example, the logical block addresses LBA1 to LBA8) stored in the data units of the stripe for storing the meta data, and store the protection information in the parity unit of this stripe.

In an embodiment of the invention, the logical block addresses LBA1~LBA16 may be the aforementioned storage pool logical block address SLBA, and the number of stripes used to store the meta data in an LAU may be equal to the number of stripes used to store user data.

Referring back to FIG. 2, according to an embodiment of the invention, when the microprocessor 220 detects that one of the flash memories is removed from the flash memory array 240, the microprocessor 220 may perform a repair operation, so as to restore the intrinsic data protection capability of the flash memory array 240, where the intrinsic data protection capability may be the original data protection capability of the flash memory array 240, that is, the protection capability initially set to the flash memory array 240. For example, suppose that the microprocessor 220 calculates two pieces of protection information (for example, P1 and Q1 or PM1 and QM1 as shown in FIG. 4) of a stripe based on the content of the data stored in the data units of the stripe, the flash memory array 240 is set to have the protection capability of +2. When the microprocessor 220 detects that one of the flash memories has been removed from the flash memory array 240, the protection capability of the flash memory array 240 will be reduced and becomes only +1. Therefore, in the embodiments of the invention, the microprocessor 220 may perform a repair operation to restore the protection capability of the flash memory array 240 to the original data protection capability, that is, +2. It should be noted that, for the sake of brevity, two pieces of protection information and the +2 data protection capability are used in the embodiment of the invention as the examples for illustration, but the invention is not limited to this. The flash memory array may use different amounts of protection information to provide different data protection capabilities.

Figure 5:
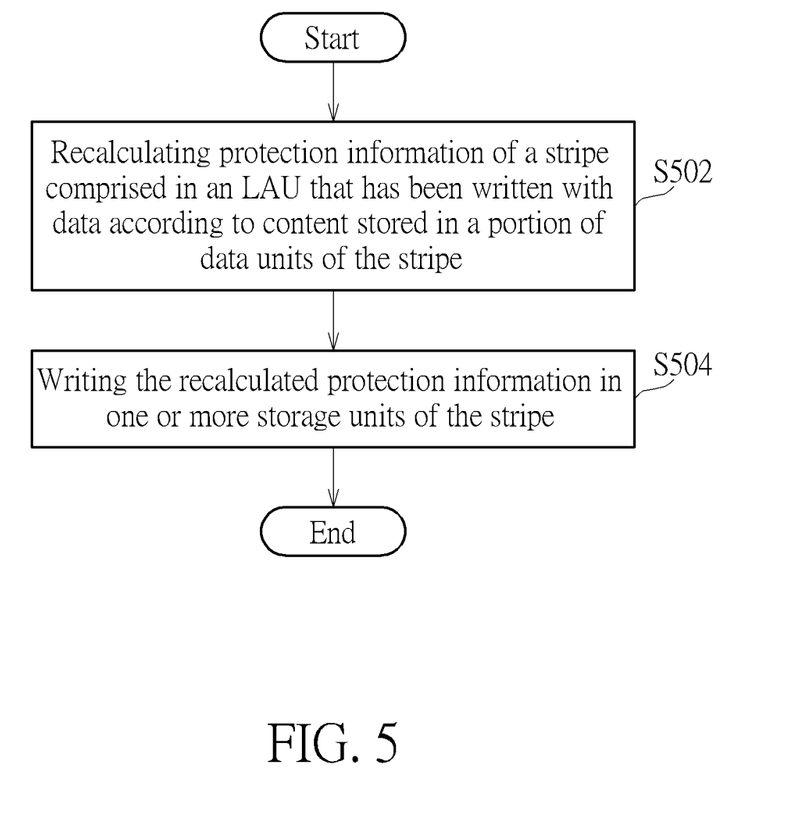
FIG. 5 is an exemplary flow chart of a data processing method for an AFA storage device according to an embodiment of the invention.

FIG. 5 is an exemplary flow chart of a data processing method for an AFA storage device according to an embodiment of the invention. According to an embodiment of the invention, as described above, in the proposed data processing method for an AFA storage device, in response to a detection result indicating that one of the flash memories has been removed from the flash memory array, the microprocessor 220 may sequentially perform a repair operation on the stripes comprised in one or more LAUs that have been written with data, so that the original data protection capability of the flash memory array can be restored.

In the embodiments of the invention, the repair operation may be repeatedly performed on each stripe comprised in the LAU(s) that has/have been written with data, until the repair operation of all LAU(s) that has/have been written with data is completed.

In the embodiment of the invention, the repair operation sequentially performed on the stripes comprised in one or more LAUs written with data may comprise the following steps:

Step S502: Recalculating protection information of a stripe comprised in an LAU that has been written with data according to content stored in a portion of data units of the stripe. It should be noted that, in the embodiments of the invention, no matter whether the storage unit corresponding to the removed flash memory in a stripe is a data unit or a parity unit, the number of data units in the portion of data units utilized in step S502 for recalculating the protection information will be less than the number of all data units (that is, the total number of data units) comprised in the stripe.

Step S504: Writing the recalculated protection information in one or more storage units of the stripe. For example, suppose that the microprocessor 220 wants to make the flash memory array to have a +2 data protection capability, the microprocessor 220 may recalculate the corresponding two pieces of protection information data based on content of the data stored in a portion of data units of a stripe, and write the recalculated protection information into the two storage units to replace the content previously or originally stored therein.

Figure 6:
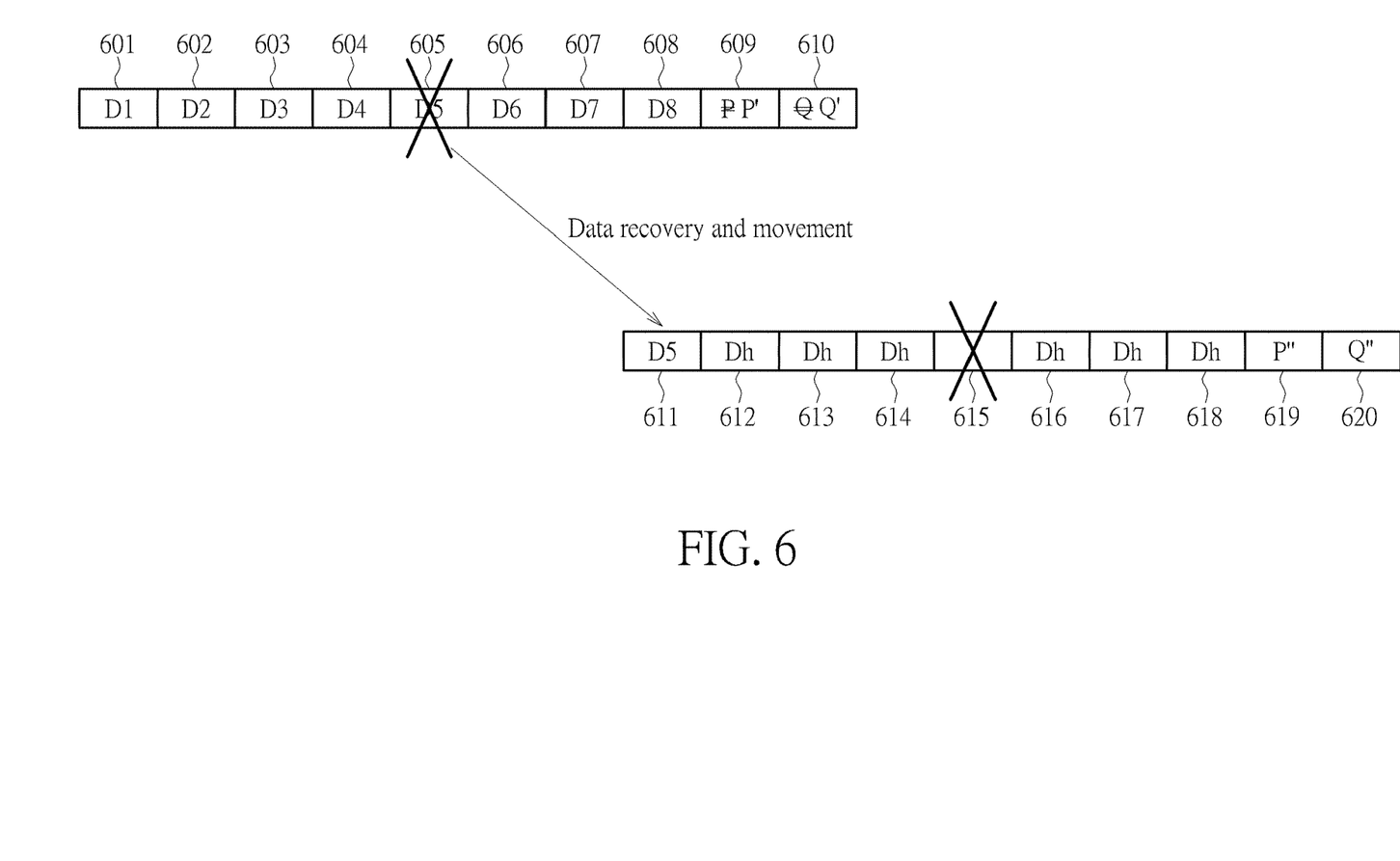
FIG. 6 is a schematic diagram showing an exemplary repair operation according to an embodiment of the invention.

FIG. 6 is a schematic diagram showing an exemplary repair operation according to an embodiment of the invention, for illustrating the repair operation when the storage unit corresponding to the removed flash memory in a stripe is a data unit. In this example, a stripe may comprise 10 storage units which are corresponding to different flash memories, such as the storage units 601 to 610 shown in FIG. 6. The storage units 601 to 608 are data units, respectively used to store data D1~D8, and storage units 609 to 610 are parity units, respectively used to store protection information P and Q corresponding to the data D1~D8 stored in this stripe.

Assuming that the storage unit 605 corresponding to the removed flash memory in this stripe is a data unit, in the repair operation, the microprocessor 220 may determine whether the data unit 605 stores valid data. If the data unit 605 does not store valid data, that is, the data D5 already becomes invalid data, the microprocessor 220 may directly discard the data D5, and recalculate the protection information corresponding to this stripe according to the data stored in the remaining data units other than the storage unit corresponding to the removed flash memory in this stripe (for example, recalculate the protection information P' and Q' corresponding to this stripe according to the data D1~D4 and D6~D8), and the microprocessor 220 may write the recalculated protection information into the parity units of this stripe to replace the content originally stored in the parity units (for example, storing the recalculated protection information P' and Q' in the storage units 609 and 610 in this stripe to replace the previous protection information P and Q). It should be noted that for the microprocessor 220, the recalculated protection information is written to the same DLBA (for example, the addresses of the storage units 609~610), while for the flash memory controller in the corresponding flash memory disk, the recalculated protection information is the updated data of the same logical address.

On the other hand, if the data stored in the data unit 605 is still valid, the microprocessor 220 needs to perform data recovery and data movement operations, including reversely deducing the data originally stored in the data unit 605 based on the content stored in this strip, and move the deduced data to another storage unit. To be more specific, the microprocessor 220 may deduce the valid data originally stored in the storage unit 605 according to the content of the data stored in the remaining storage units in the stripe. After obtaining the valid data originally stored in the data unit 605 (for example, the data D5 shown in FIG. 6), the microprocessor 220 may write the deduced valid data D5 into a storage unit of an active LAU (for example, in the storage unit 611 shown in FIG. 6). Here, the active LAU refers to the logical aggregation unit that is currently being configured to receive user data (for example, the data Dh shown in FIG. 6). After the data units (for example, storage units 611 to 618) in the active LAU are full, the microprocessor 220 may calculate corresponding two pieces of protection information (for example, the protection information P'' and Q'' shown in FIG. 6) according to the content of the data stored in the data units and write them into the corresponding parity units (for example, storage units 619 and 620).

In addition, the microprocessor 220 is configured to update mapping information of a logical address (for example, the SLBA) corresponding to the deduced (recovered) valid data in a mapping table (for example, a storage pool to disk (S2D) mapping table) according an address (for example, the DLBA) of the data unit (for example, the storage unit 611 shown in FIG. 6) of the active LAU that is used to store the deduced (recovered) valid data. For example, the S2D mapping information of the SLBA corresponding to the valid data in the S2D mapping table is modified to record the DLBA of the storage unit 611.

According to an embodiment of the invention, the microprocessor 220 may establish the aforementioned S2D mapping table for the flash memory array 240 to record the corresponding DLBA for each SLBA, and store the S2D mapping table in the memory device 230. The DLBA corresponding to one SLBA indicates in which DLBA the data corresponding to the SLBA is stored.

The microprocessor 220 may determine whether the data stored in a data unit is valid data by determining whether the S2D mapping information recorded in the S2D mapping table corresponds to the D2S mapping information recorded in the LAU. To be more specific, the S2D mapping table may comprise multiple fields. One field may correspond to one SLBA and is used to record in which DLBA of the memory array 240 the data corresponding to this SLBA is actually stored. The number of fields in the S2D mapping table may be equal to the total number of logical block addresses or storage units viewed or recognized by the volume management module 310 and/or the flash array control module 320.

In addition, as discussed above, one or more stripes for storing the meta data in an LAU may record the D2S mapping information of multiple stripes of this LAU. When determining whether the data stored in a data unit (for example, the data unit DU_a) is still valid, the microprocessor 220 may first check the meta data of this data unit recorded in the LAU comprising this data unit, so as to know the D2S mapping information of this data unit, for example, obtaining the storage pool logical block address SLBA_a corresponding to this data unit DU_a (that is, knowing that the data currently stored in this data unit is corresponding to the storage pool logical block address SLBA_a). Then, the microprocessor 220 may check the content recorded in the S2D mapping table corresponding to this logical block address SLBA_a in the memory device 230 to know the S2D mapping information of this logical block address SLBA_a, for example, obtaining the disk logical block address DLBA_a currently mapped to this storage pool logical block address SLBA_a (that is, knowing that the data corresponding to this storage pool logical block address SLBA_a is currently stored in the disk logical area Block address DLBA_a). If the disk logical block address DLBA_a is equal to the disk logical block address of the data unit DU_a, it means that the data stored in the data unit DU_a is valid data. If the disk logical block address DLBA_a is not equal to the disk logical block address of the data unit DU_a, it means that the data of this storage pool logical block address SLBA_a has been updated and stored in other data unit, so the data stored in the data unit DU_a is invalid.

In addition, as described above, in the embodiment of the invention, for the microprocessor 220, although the aforementioned operation is to write the recalculated protection information P' and Q' in the same disk logical block address DLBA to replace the previous protection information P and Q, but for the memory controller in the corresponding flash memory disk, this operation is actually performed by writing the recalculated protection information P' and Q' into new (that is, other) physical addresses. In addition, the memory controller may also establish and maintain the corresponding logical to physical (L2P) mapping table for the corresponding flash memory disk, and modify the L2P mapping information of the logical addresses (for example, the disk logical block addresses of the storage units 609 to 610) for this flash memory disk to record the physical addresses of the storage units actually storing the protection information P' and Q'. With this operation, the previous protection information P and Q become invalid data.

Figure 7:
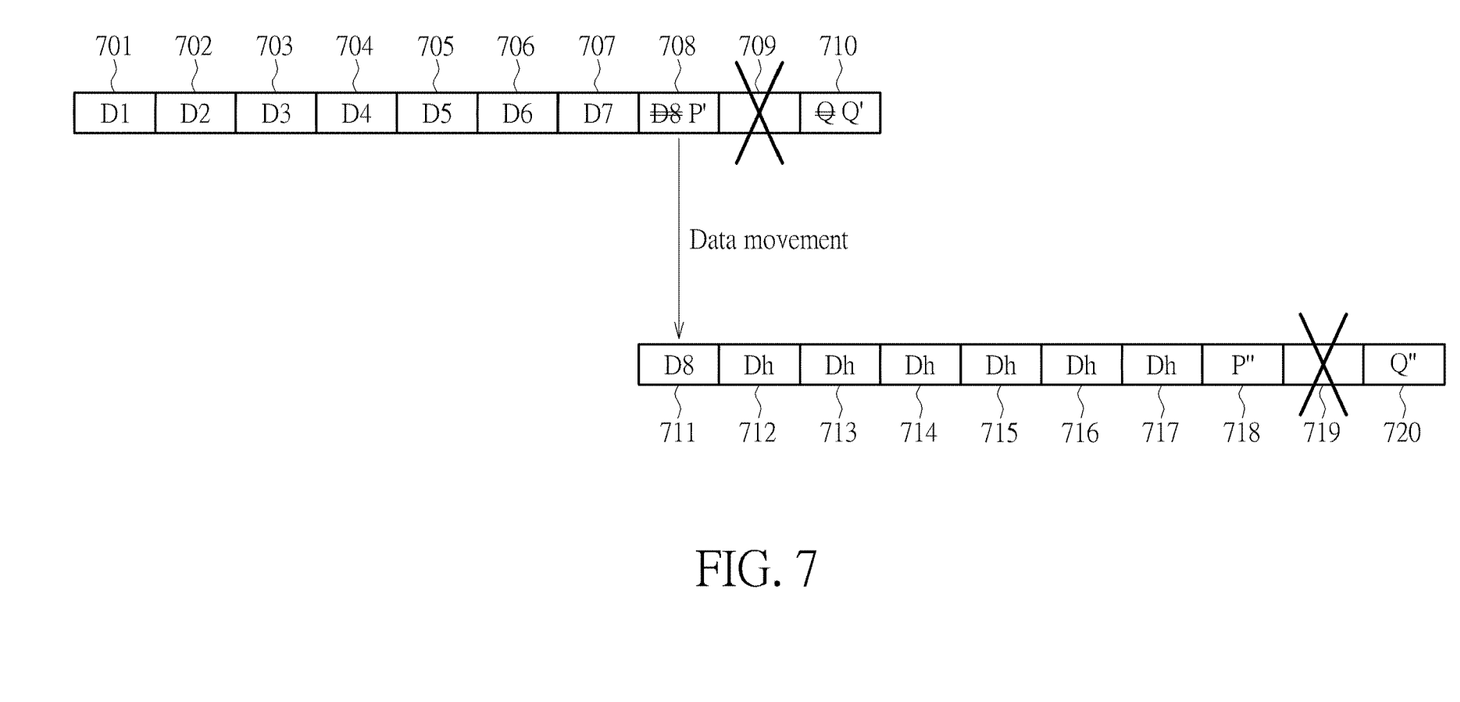
FIG. 7 is a schematic diagram showing another exemplary repair operation according to an embodiment of the invention.

FIG. 7 is a schematic diagram showing another exemplary repair operation according to an embodiment of the invention, for illustrating the repair operation when the storage unit corresponding to the removed flash memory in a stripe is a parity unit. In this example, a stripe may comprise 10 storage units which are corresponding to different flash memories, such as the storage units 701 to 710 shown in FIG. 7. The storage units 701 to 708 are data units, respectively used to store data D1 to D8, and storage units 709 and 710 are parity units, respectively used to store protection information P and Q corresponding to the data D1 to D8 stored in this stripe.

Assuming that the storage unit 709 corresponding to the removed flash memory in this stripe is a parity unit, in the repair operation, the microprocessor 220 may select one data unit from the data units in the same stripe, for example but not limited to, select the storage unit 708 closest to the storage unit 709, and recalculate the protection information of this stripe based on the content stored in the remaining data units other than the selected data unit in this stripe (for example, recalculate the protection information P' and Q' of this stripe according to the data D1 to D7 shown in FIG. 7), and the microprocessor 220 may write the recalculated protection information into the selected storage unit to replace the content originally stored in the storage unit (for example, the protection information P' is stored in the storage unit 708 to replace the previously stored data D8), and write the recalculated protection information into the un-removed parity unit in this stripe to replace the content originally stored in this parity unit (for example, the protection information Q' is stored in the storage unit 710 to replace the previously stored protection information Q).

In addition, the microprocessor 220 may determine whether the selected storage unit stores valid data. If the data D8 stored in the selected storage unit 708 is already invalid, the microprocessor 220 may directly discard the data D8. If the data D8 stored in the selected storage unit 708 is still valid, the microprocessor 220 may move (write) the data D8 to a data unit (for example, the storage unit 711 shown in FIG. 7) of an active LAU. After the data units in the active LAU (for example, storage units 711 to 718) are full, the microprocessor 220 may calculate corresponding two pieces of protection information (for example, the protection information P''' and Q''' shown in the FIG. 7) according to the content of the data stored in the data units and write them into the corresponding parity units (for example, storage units 719 and 720).

In addition, the microprocessor 220 may update mapping information of a logical address (for example, the SLBA) corresponding to the valid data in a mapping table (for example, the S2D mapping table) according an address (for example, the DLBA) of the data unit (for example, the storage unit 711 shown in FIG. 7) of the active LAU that is used to store the moved valid data (for example, the data D8 shown in FIG. 7). For example, the S2D mapping information of the SLBA corresponding to the valid data in the S2D mapping table is modified to record the DLBA of the storage unit 711.

Similarly, in the embodiment of the invention, for the microprocessor 220, although the aforementioned operation is to write the recalculated protection information P' and Q' in the same disk logical block address DLBA to replace the previously stored user data and protection information, but for the memory controller in the corresponding flash memory disk, this operation is actually performed by writing the recalculated protection information P' and Q' into new (that is, other) physical addresses. The memory controller may further modify the L2P mapping information of the logical addresses (for example, the DLBA of the storage units 708 and 710) for this flash memory disk in the L2P mapping table internally maintained by the memory controller to record the physical addresses of the storage units actually storing the protection information P' and Q'. With this operation, the user data and protection information previously stored become invalid data.

It should be noted that, in the embodiments of the invention, no matter whether the storage unit corresponding to the removed flash memory is a data unit or a parity unit, in the repair operation corresponding to one stripe, at most three write operations are required. For example, in the embodiment shown in FIG. 6, if the data D5 is still valid, the write operations required in the repair operation comprise writing the data D5 into the storage unit 611 and writing the recalculated protection information P' and Q' into the storage units 609 and 610. On the other hand, when the data D5 is invalid, only two write operations are required, comprising the write operations of writing the recalculated protection information P' and Q' into the storage units 609 and 610.

Similarly, in the embodiments shown in FIG. 7, if the data D8 is still valid, the write operations required in the repair operation comprise writing the data D8 into the storage unit 711 and writing the recalculated protection information P' and Q' into the storage units 708 and 710. On the other hand, when the data D8 is invalid, only two write operations are required, comprising the write operations of writing the recalculated protection information P' and Q' into the storage units 708 and 710.

In the prior art, in the repair operation corresponding to one stripe, at most N write operations are required, where N is the total number of flash memory disks or flash memories comprised in the AFA storage device. Therefore, when N is a large number, such a large number of write operations will cause the performance of the storage device to drop significantly. Compared with the prior art, in the proposed data processing method, only three write operations need to be performed at most in the repair operation corresponding to one stripe. In this manner, the problem of introducing excessive write operations due to the need of performing the operations related to the restoring of the original data protection capability to cause in a significant drop in the performance of the storage device can be effectively solved.

Figure 8:
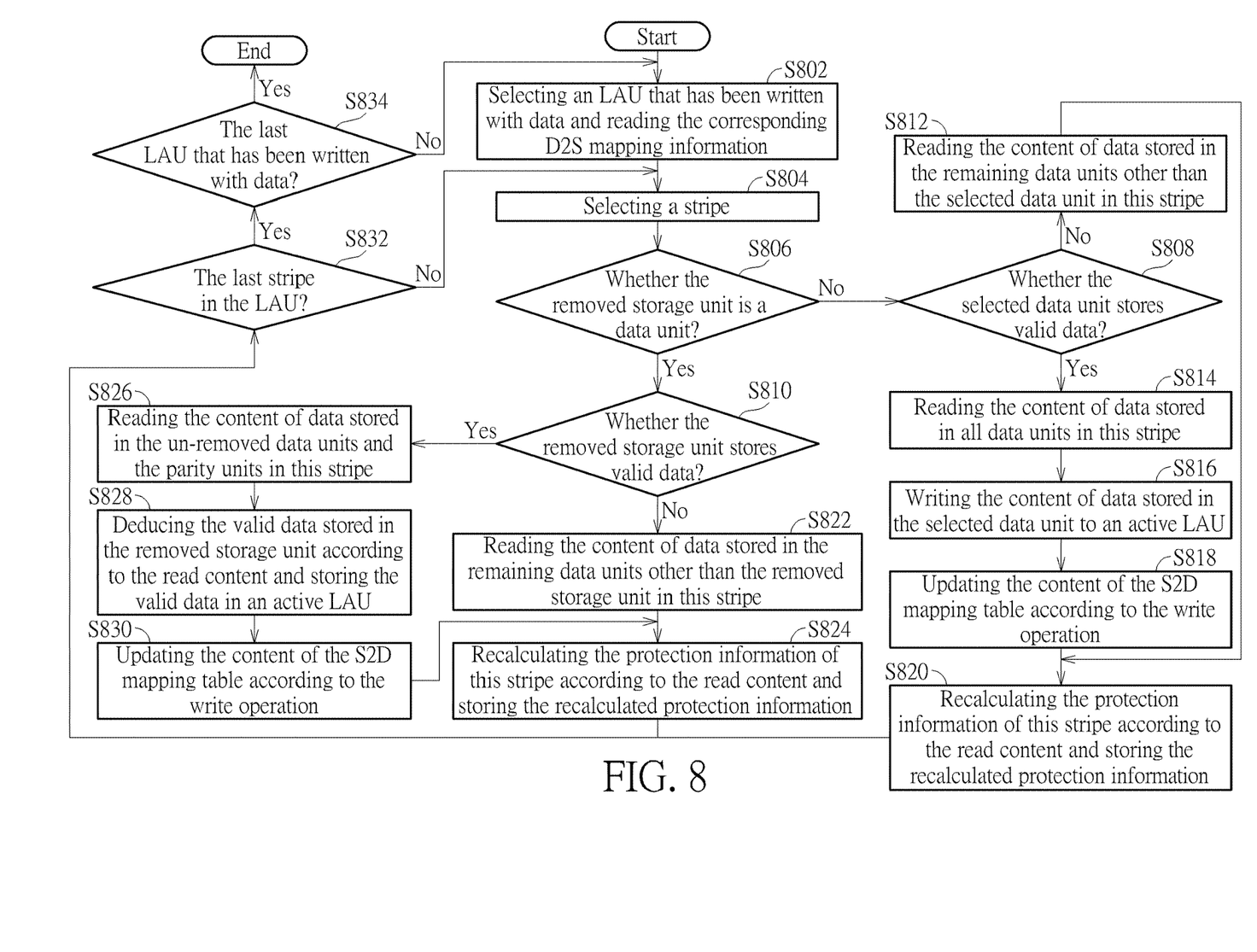
FIG. 8 is a detailed flow chart of a data processing method for an AFA storage device according to an embodiment of the invention.

FIG. 8 is a detailed flow chart of a data processing method for an AFA storage device according to an embodiment of the invention. The data processing method may begin in response to detection of one of the flash memory disks being removed, and may comprise the following steps:

Step S802: Selecting, by the microprocessor 220, an LAU that has been written with data and reading the meta data stored in this LAU to obtain the D2S mapping information of the storage units comprised in this LAU.

Step S804: Selecting, by the microprocessor 220, a stripe in this LAU. For example, the microprocessor 220 may sequentially select the stripes comprised in this LAU from the first stripe according to the stripe number or the corresponding index value.

Step S806: Determining, by the microprocessor 220, whether a storage unit in the stripe corresponding to the removed flash memory/flash memory disk (or, the removed storage unit to simplify the description) is a data unit. If no, step S808 is performed. If yes, step S810 is performed. It should be noted that, in step S806, the determination of "whether the removed storage unit is a data unit" may be replaced by "whether the removed storage unit is a parity unit". Based on this determination, step S808 is performed if yes. If no, step S810 is performed.

Step S808: Selecting, by the microprocessor 220, a data unit from this stripe and determining whether the selected data unit stores valid data. If no, step S812 is performed. If yes, step S814 is performed.

Step S810: Determining, by the microprocessor 220, whether the removed storage unit stores valid data. If no, step S822 is performed. If yes, step S826 is performed.

Step S812: Reading, by the microprocessor 220, the content of data stored in the remaining data units other than the selected data unit in this stripe.

Step S814: Reading, by the microprocessor 220, the content of data stored in all data units in this stripe.

Step S816: Writing, by the microprocessor 220, the content of data stored in the selected data unit to an active LAU.

Step S818: Updating, by the microprocessor 220, the content of the S2D mapping table maintained by the microprocessor 220 for the flash memory array 240 according to the write operation in step S816, such as the update operation described accompany the illustrations of FIG. 7.

Step S820: Recalculating, by the microprocessor 220, the protection information of this stripe according to the content of the data stored in the remaining data units other than the selected data unit in this stripe and storing the recalculated protection information. As discussed above, when there is more than one protection information corresponding to this stripe, the protection information may be written in the DLBA of the selected data unit and the DLBA of the un-removed parity unit in this stripe, so as to replace the content originally stored therein.

It should be noted that that, in FIG. 8, the text "read content" in step S820 in the sentence "recalculating the protection information of this stripe according to the read content" may refer to the content of data stored in the remaining data units other than the selected data unit in this stripe read in step S812 or may refer to the content of data stored in the remaining data units other than the selected data unit in this stripe read in step S814.

Step S822: Reading, by the microprocessor 220, the content of data stored in the remaining data units other than the removed storage unit in this stripe.

Step S824: Recalculating, by the microprocessor 220, the protection information of this stripe according to the content of the data stored in the remaining data units other than the removed storage unit in this stripe and storing the recalculated protection information. As discussed above, when there is more than one protection information corresponding to this stripe, the protection information may be written in the DLBAs of the parity units in this stripe to replace the protection information previously stored therein.

It should be noted that that, in FIG. 8, the text "read content" in step S824 in the sentence "recalculating the protection information of this stripe according to the read content" may refer to the content of data stored in the remaining data units other than the removed storage unit in this stripe read in step S822 or the content of data stored in the remaining data units other than the removed storage unit in this stripe read in step S826.

Step S826: Reading, by the microprocessor 220, the content of data stored in the un-removed data units (that is, the remaining data units other than the removed storage unit) and the parity units in this stripe.

Step S828: Deducing, by the microprocessor 220, the valid data stored in the removed storage unit according to the read content and storing the valid data deduced by the microprocessor 220 in an active LAU.

Step S830: Updating, by the microprocessor 220, the content of the S2D mapping table maintained by the microprocessor 220 for the flash memory array 240 according to the write operation in step S828, such as the update operation described accompany the illustrations of FIG. 6.

Step S832: Determining, by the microprocessor 220, whether the currently processed stripe is the last stripe in the LAU. If yes, it means that the repair operations of all stripes comprised in the currently selected LAU are completed, and step S834 is performed. If no, step S804 is returned to select the next unprocessed stripe.

Step S834: Determining, by the microprocessor 220, whether the currently processed LAU is the last LAU that has been written with data. If yes, it means that the repair operations of all LAUs that may be affected by the removal or loss of disk are completed. If no, step S802 is returned to select the next unprocessed LAU.

In summary, in the processed data processing method, at most three write operations are required when performing the repair operation corresponding to each stripe. With the improvement of the invention, the write operation introduced by performing the repair operation is unrelated to the total number of flash memories or flash memory disks comprised in the AFA storage device. In this manner, the original data protection capability can be recovered in a highly efficient way, and the problem of introducing excessive write operations due to the need of performing the operations related to the restoring of the original data protection capability to cause in a significant drop in the performance of the storage device can be effectively solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An all flash array storage device, comprising:
a flash memory array comprising a plurality of flash memories, wherein the flash memories correspond to a plurality of logical aggregation units, each logical aggregation unit comprises a plurality of stripes, each stripe comprises a plurality of storage units, and the storage units comprise a plurality of data units for storing data and at least one parity unit for storing protection information; and
a microprocessor, coupled to the flash memory array and configured to detect a status of the flash memories, wherein when the microprocessor detects one of the flash memories has been removed from the flash memory array, the microprocessor is configured to sequentially perform a repair operation on the stripes comprised in one or more logical aggregation units that have been written with data, and
wherein in the repair operation corresponding to a stripe which is one of the stripes comprised in said one or more logical aggregation units that have been written with data, the microprocessor is configured to recalculate the protection information of the stripe according to content stored in a portion of data units of the stripe and write the recalculated protection information in one or more storage units of the stripe, and wherein a number of data units in the portion of data units of the stripe is less than a number of all data units comprised in the stripe.

2. The all flash array storage device as claimed in claim 1, wherein in the repair operation corresponding to the stripe, the microprocessor is further configured to determine whether a storage unit in the stripe corresponding to the removed flash memory is a parity unit, and when the storage unit in the stripe corresponding to the removed flash memory is a parity unit, the microprocessor is configured to select a data unit from the stripe, recalculate the protection information of the stripe according to particular content stored in remaining data units in the stripe other than the selected data unit, and store the protection information of the stripe recalculated according to the particular content in the selected data unit to replace content originally stored in the selected data unit.

3. The all flash array storage device as claimed in claim 2,
wherein in the repair operation corresponding to the stripe, the microprocessor is further configured to determine whether the selected data unit stores valid data, and when the selected data unit stores valid data, the microprocessor is configured to read the valid data stored in the selected data unit, write the valid data in a data unit of an active logical aggregation unit, and update mapping information of a logical address corresponding to the valid data in a mapping table according to an address of the data unit of the active logical aggregation unit.

4. The all flash array storage device as claimed in claim 1, wherein in the repair operation corresponding to the stripe, the microprocessor is further configured to determine whether a storage unit in the stripe corresponding to the removed flash memory is a data unit, and when the storage unit in the stripe corresponding to the removed flash memory is a data unit, the microprocessor is configured to recalculate the protection information of the stripe according to particular content stored in remaining data units in the stripe other than the storage unit corresponding to the removed flash memory and store the protection information of the stripe recalculated according to the particular content in the parity unit of the stripe to replace content originally stored in the parity unit.

5. The all flash array storage device as claimed in claim 4,
wherein in the repair operation corresponding to the stripe, the microprocessor is further configured to determine whether the storage unit in the stripe corresponding to the removed flash memory stores valid data, and when the storage unit corresponding to the removed flash memory stores valid data, the microprocessor is configured to read content stored in remaining storage units in the stripe other than the storage unit corresponding to the removed flash memory, deduce the valid data originally stored in the storage unit corresponding to the removed flash memory according to the read content, write the valid data deduced by the microprocessor in a data unit of an active logical aggregation unit, and update mapping information of a logical address corresponding to the valid data in a mapping table according to an address of the data unit of the active logical aggregation unit.

6. A data processing method for an all flash array storage device, wherein the all flash array storage device comprises a flash memory array, the flash memory array comprises a plurality of flash memories, the flash memories correspond to a plurality of logical aggregation units, each logical aggregation unit comprises a plurality of stripes, each stripe comprises a plurality of storage units, and the storage units comprise a plurality of data units for storing data and at least one parity unit for storing protection information, and the data processing method comprises:
sequentially performing a repair operation on the stripes comprised in one or more logical aggregation units that have been written with data in response to a detection result indicating that one of the flash memories has been removed from the flash memory array,
wherein in the repair operation corresponding to a stripe which is one of the stripes comprised in said one or more logical aggregation units that have been written with data, the data processing method further comprises:
recalculating the protection information of the stripe according to content stored in a portion of data units of the stripe; and
writing the recalculated protection information in one or more storage units of the stripe,
wherein a number of data units in the portion of data units of the stripe is less than a number of all data units comprised in the stripe.

7. The data processing method as claimed in claim 6, wherein in the repair operation corresponding to the stripe, the data processing method further comprises:
determining whether a storage unit in the stripe corresponding to the removed flash memory is a parity unit; and
when the storage unit in the stripe corresponding to the removed flash memory is a parity unit, selecting a data unit from the stripe, recalculating the protection information of the stripe according to particular content stored in remaining data units in the stripe other than the selected data unit, and storing the protection information of the stripe recalculated according to the particular content in the selected data unit to replace content originally stored in the selected data unit.

8. The data processing method as claimed in claim 7,
wherein in the repair operation corresponding to the stripe, the data processing method further comprises:
determining whether the selected data unit stores valid data; and
when the selected data unit stores valid data, reading the valid data stored in the selected data unit, writing the valid data in a data unit of an active logical aggregation unit, and updating mapping information of a logical address corresponding to the valid data in a mapping table according to an address of the data unit of the active logical aggregation unit.

9. The data processing method as claimed in claim 6, wherein in the repair operation corresponding to the stripe, the data processing method further comprises:
determining whether a storage unit in the stripe corresponding to the removed flash memory is a data unit; and
when the storage unit in the stripe corresponding to the removed flash memory is a data unit, recalculating the protection information of the stripe according to particular content stored in remaining data units in the stripe other than the storage unit corresponding to the removed flash memory, and storing the protection information of the stripe recalculated according to the particular content in the parity unit of the stripe to replace content originally stored in the parity unit.

10. The data processing method as claimed in claim 9,
wherein in the repair operation corresponding to the stripe, the data processing method further comprises:
determining whether the storage unit in the stripe corresponding to the removed flash memory stores valid data; and
when the storage unit corresponding to the removed flash memory stores valid data, reading content stored in remaining storage units in the stripe other than the storage unit corresponding to the removed flash memory, deducing the valid data originally stored in the storage unit corresponding to the removed flash memory according to the read content, writing the valid data in a data unit of an active logical aggregation unit, and updating mapping information of a logical address corresponding to the valid data in a mapping table according to an address of the data unit of the active logical aggregation unit.

11. An all flash array controller, including:
a memory device; and
a microprocessor, coupled to the memory device and a flash memory array and configured to manage the flash memory array according to data stored in the memory device, wherein the flash memory array comprises a plurality of flash memories, the flash memories correspond to a plurality of logical aggregation units, each logical aggregation unit comprises a plurality of stripes, each stripe comprises a plurality of storage units, and the storage units comprise a plurality of data units for storing data and at least one parity unit for storing protection information, when the microprocessor detects that a loss of a disk has occurred to the flash memory array, the microprocessor is configured to sequentially perform a repair operation on the stripes comprised in one or more logical aggregation units that have been written with data, and wherein in the repair operation corresponding to a stripe which is one of the stripes comprised in said one or more logical aggregation units that have been written with data, the microprocessor is configured to recalculate the protection information of the stripe according to content stored in a portion of data units of the stripe and write the recalculated protection information in one or more storage units of the stripe, and wherein a number of data units in the portion of data units of the stripe is less than a number of all data units comprised in the stripe.

12. The all flash array controller as claimed in claim 11, wherein in the repair operation corresponding to the stripe, the microprocessor is further configured to determine whether a storage unit in the stripe corresponding to a damaged or removed flash memory is a parity unit, and when the storage unit in the stripe corresponding to the damaged or removed flash memory is a parity unit, the microprocessor is configured to select a data unit from the stripe, recalculate the protection information of the stripe according to particular content stored in remaining data units in the stripe other than the selected data unit, and store the protection information of the stripe recalculated according to the particular content in the selected data unit to replace content originally stored in the selected data unit.

13. The all flash array controller as claimed in claim 12, wherein in the repair operation corresponding to the stripe, the microprocessor is further configured to determine whether the selected data unit stores valid data, and when the selected data unit stores valid data, the microprocessor is configured to read the valid data stored in the selected data unit, write the valid data in a data unit of an active logical aggregation unit, and update mapping information of a logical address corresponding to the valid data in a mapping table according to an address of the data unit of the active logical aggregation unit.

14. The all flash array controller as claimed in claim 11, wherein in the repair operation corresponding to the stripe, the microprocessor is further configured to determine whether a storage unit in the stripe corresponding to a damaged or removed flash memory is a data unit, and when the storage unit in the stripe corresponding to the damaged or removed flash memory is a data unit, the microprocessor is configured to recalculate the protection information of the stripe according to particular content stored in remaining data units in the stripe other than the storage unit corresponding to the damaged or removed flash memory and store the protection information of the stripe recalculated according to the particular content in the parity unit of the stripe to replace content originally stored in the parity unit.

15. The all flash array controller as claimed in claim 14, wherein in the repair operation corresponding to the stripe, the microprocessor is further configured to determine whether the storage unit in the stripe corresponding to the damaged or removed flash memory stores valid data, and when the storage unit corresponding to the damaged or removed flash memory stores valid data, the microprocessor is configured to read content stored in remaining storage units in the stripe other than the storage unit corresponding to the damaged or removed flash memory, deduce the valid data originally stored in the storage unit corresponding to the damaged or removed flash memory according to the read content, write the valid data deduced by the microprocessor in a data unit of an active logical aggregation unit, and update mapping information of a logical address corresponding to the valid data in a mapping table according to an address of the data unit of the active logical aggregation unit.

* * * * *